United States Patent
Rahmes et al.

(10) Patent No.: US 12,463,680 B2
(45) Date of Patent: Nov. 4, 2025

(54) COGNITIVE RADIO SYSTEM PROVIDING OPERATING PARAMETER CHANGES BASED UPON COGNITIVE GROUP HIERARCHY AND RELATED METHODS

(71) Applicant: EAGLE TECHNOLOGY, LLC, Melbourne, FL (US)

(72) Inventors: Mark D. Rahmes, Melbourne, FL (US); Chad Lau, Melbourne, FL (US); David B. Chester, Palm Bay, FL (US); Jason Calvert, Melbourne, FL (US); Daniel Garcia, West Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 665 days.

(21) Appl. No.: 17/935,308

(22) Filed: Sep. 26, 2022

(65) Prior Publication Data
US 2024/0106494 A1 Mar. 28, 2024

(51) Int. Cl.
*H04B 1/715* (2011.01)
*H04K 3/00* (2006.01)
*H04W 72/0453* (2023.01)

(52) U.S. Cl.
CPC ............. *H04B 1/715* (2013.01); *H04K 3/224* (2013.01); *H04W 72/0453* (2013.01); *H04B 2001/7154* (2013.01)

(58) Field of Classification Search
CPC ............ H04B 1/715; H04B 2001/7154; H04K 3/224; H04W 72/0453; H04W 16/14
See application file for complete search history.

(56) References Cited

U.S. PATENT DOCUMENTS

| 7,778,367 B1 | 8/2010 | Stockmaster |
| 8,706,041 B2 | 4/2014 | Palomar et al. |

(Continued)

FOREIGN PATENT DOCUMENTS

| CN | 108242961 | 7/2018 |
| CN | 113973362 | 1/2022 |

(Continued)

OTHER PUBLICATIONS

Andrew L. Drozd "Cognitive Radio Spectrum Management and Waveform Adaptation for Advanced Wideband Space Communication Systems" 2011; pp. 3 https://sbir.defensebusiness.org/content/static/selections/sttr/sttr_2011B.html.

(Continued)

*Primary Examiner* — Yuwen Pan
*Assistant Examiner* — Fatuma G Sherif
(74) *Attorney, Agent, or Firm* — ALLEN, DYER, DOPPELT, + GILCHRIST, P.A. Attorneys at Law

(57) ABSTRACT

A cognitive radio system may include cognitive radio frequency (RF) radios and a controller configured to selectively change at least one operating parameter of the cognitive RF radios based upon a cognitive group hierarchy. The cognitive group hierarchy may include a first group based upon a signal modulation classification, a second group based upon a waveform requirement, a third group based upon an optimal cognitive RF radio path, a fourth group based upon a cognitive RF radio dynamic spectrum allocation, and a fifth group based upon frequency hopping.

22 Claims, 17 Drawing Sheets

(56) References Cited

U.S. PATENT DOCUMENTS

| | | | |
|---|---|---|---|
| 8,929,936 | B2 | 1/2015 | Mody et al. |
| 9,053,426 | B2 | 6/2015 | Chester et al. |
| 9,122,993 | B2 | 9/2015 | Chester et al. |
| 9,147,164 | B2 | 9/2015 | Chester et al. |
| 9,232,527 | B2 | 1/2016 | Sonnenberg et al. |
| 9,538,528 | B2 | 1/2017 | Wagner et al. |
| 9,641,280 | B1 | 5/2017 | Shen et al. |
| 9,729,562 | B2 | 8/2017 | Sonnenberg et al. |
| 10,291,347 | B2 | 5/2019 | Wang et al. |
| 10,965,394 | B1 | 3/2021 | Eisenman |
| 2006/0221918 | A1* | 10/2006 | Wang .................... H04W 4/029 370/338 |
| 2008/0293353 | A1* | 11/2008 | Mody ..................... H04K 3/45 455/1 |
| 2010/0248631 | A1* | 9/2010 | Chaudhri ............ H04W 72/563 455/62 |
| 2011/0103454 | A1* | 5/2011 | Bose ................. H04L 25/03165 375/232 |
| 2012/0071189 | A1* | 3/2012 | Mody ................... H04W 16/14 455/515 |
| 2020/0153535 | A1 | 5/2020 | Jayaweera Kankanamge |

FOREIGN PATENT DOCUMENTS

| | | |
|---|---|---|
| EP | 3789922 | 3/2021 |
| IN | 4547/MUM/2015 | 12/2015 |
| IN | 201741017851 | 5/2017 |
| JP | 2009206934 | 9/2009 |

OTHER PUBLICATIONS

Bharathi et al "Defense against responsive and non-responsive jamming attack in cognitive radio networks: an evolutionary game theoretical approach," in the Journal of Engineering, vol. 2018, Iss.2; pp. 68-75.

Dabcevic et al "Intelligent cognitive radio jamming a game-theoretical approach" EURASIP J. Adv. Signal Process., vol. 2014, No. 1, pp. 1-18, 2014.

Deepak et al "Radio frequency anti-jamming capability improvement for cognitive radio networks: An evolutionary game theoretical approach," 2017 4th International Conference on Signal Processing, Communication and Networking (ICSCN): pp. 6.

Hanawai et al "Game theoretic anti-jamming dynamic frequency hopping and rate adaptation in wireless systems," 2014 12th International Symposium on Modeling and Optimization in Mobile, Ad Hoc, and Wireless Networks (WiOpt), Hammamet, 2014, pp. 247-254.

Li et al. "Anti-jamming performance of cognitive radio network," 2011 45th Annual Conference on Information Sciences and Systems, Baltimore, MD, 2011; pp. 6.

Nafaa et al "Forward error correction strategies for media streaming over wireless networks" in IEEE Communications Magazine, vol. 46, No. 1, pp. 72-79, Jan. 2008.

Oskoui et al. "Using game theory to battle jammer in control channels of cognitive radio ad hoc networks" 2016 IEEE International Conference on Communications (ICC), Kuala Lumpur, 2016, pp. 1-5.

Rawat et al. "Securing space communication systems against reactive cognitive jammer," 2015 IEEE Wireless Communications and Networking Conference (WCNC), New Orleans, LA, 2015.

Slimeni et al "Learning multi-channel power allocation against smart jammer in cognitive radio networks" 2016 International Conference on Military Communications and Information Systems (ICMCIS): 2016, pp. 1-7.

Tian et al "Jamming/Anti-jamming Game with a Cognitive Jammer in Space Communication" Proceedings of SPIE—The Internatinal Society for Optical Engineering: May 2012; pp. 11.

Wu et al "Anti-Jamming Games in Multi-Channel Cognitive Radio Networks" in IEEE Journal on Selected Areas in Communications, vol. 30, No. 1, pp. 4-15, Jan. 2012.

Lichtman et al "Reinforcement Learning for Reactive Jamming Mitigation" Journal of Cyber Security: vol. 3 No. 2; pp. 213-230.

Shah et al. "A game theory based model for cooperative spectrum sharing in cognitive radio" International Journal of Current Engineering and Technology: 2014 4(3); pp. 5.

Le et al. "A dynamic spectrum allocation scheme with interference mitigation in cooperative networks" In 2008 IEEE Wireless Communications and Networking Conference: Mar. 2008; pp. 3175-3180.

Paul et al. "A metaheuristic based fair dynamic spectrum allocation policy" In 2011 Fifth IEEE International Conference on Advanced Telecommunication Systems and Networks: Dec. 2011; pp. 1-6.

Shih et al. "Joint routing and spectrum allocation for multi-hop cognitive radio networks with route robustness consideration" IEEE Transactions on Wireless Communications: 2011 10(9); 2940-2949.

An et al. Variational autoencoder based anomaly detection using reconstruction probability Special Lecture on IE,: 2015 2(1), 1-18. Abstract Only.

Kawachi et al. "Complementary set variational autoencoder for supervised anomaly detection" In 2018 IEEE International Conference on Acoustics, Speech and Signal Processing (ICASSP) Apr. 2018; pp. 2366-2370. Abstract Only.

Kingma et al. "Auto-encoding variational bayes" 2013. arXiv preprint arXiv:1312.6114.

Wang et al. "Diverse and accurate image description using a variational auto-encoder with an additive gaussian encoding space" Advances in Neural Information Processing Systems: 2017.

Bkassiny et al. "A Survey on Machine-Learning Techniques in Cognitive Radios" IEEE Communicatins Surveys & Tutorials: vol. 15, No. 3rd Quarder 2013; pp. 1136-1159.

Joseph Mitola, III "Cognitive Radio Architecture Evolution: Systems for automatic selection of radio bands and operating modes are evolving to meet user needs at specific times and places" Proceedings of the IEEE: vol. 97, No. 4, Apr. 2009; pp. 16.

U.S. Appl. No. 17/935,289, filed Sep. 26, 2022 Rhames et al.

Dabcevic et al. "A Game-theoretical Analysis of Intelligent Cognitive Radio Jamming" GTTI 2014 Session on Telecommunication Networks:a preliminary version of a paper submitted to EURASIP Journal on Advances in Signal Processings; pp. 6.

\* cited by examiner

48 ↙

OBSERVATIONS OF NATURE
(INFLUENCED BY RED PLAYER)

| BLUE PLAYER STRATEGIES (PLACEMENT OF KEEP OUT ZONE) | ERROR RATE FREQUENCY MAP | ENERGY DETECTION FREQUENCY MAP | HIGH ORDER STATISTICS FREQUENCY MAP |
|---|---|---|---|
| BLUE PLAYER CHOICE #1 (LOWEST FREQUENCY) | HIST(0) | POWER(0) | STAT(0) |
| BLUE PLAYER CHOICE #2 (NEXT LOWEST FREQUENCY) | HIST(1) | POWER(1) | STAT(1) |
| ... | ... | ... | ... |
| BLUE PLAYER CHOICE #N (HIGHEST FREQUENCY) | HIST(N) | POWER(N) | STAT(N) |

OBSERVATIONS OF NATURE
(INFLUENCED BY BLUE PLAYER)

| RED PLAYER STRATEGIES (PLACEMENT OF KEEP OUT ZONE) | ERROR RATE FREQUENCY MAP | ENERGY DETECTION FREQUENCY MAP | HIGH ORDER STATISTICS FREQUENCY MAP |
|---|---|---|---|
| BLUE PLAYER CHOICE #1 (LOWEST FREQUENCY) | HIST(0) | POWER(0) | STAT(0) |
| BLUE PLAYER CHOICE #2 (NEXT LOWEST FREQUENCY) | HIST(1) | POWER(1) | STAT(1) |
| ... | ... | ... | ... |
| BLUE PLAYER CHOICE #N (HIGHEST FREQUENCY) | HIST(N) | POWER(N) | STAT(N) |

| | MARGINAL CONTRIBUTIONS | | | | | SHAPLEY VALUE |
|---|---|---|---|---|---|---|
| | EDGE 1_2 | EDGE 1_3 | EDGE 1_4 | EDGE 2_3 | EDGE 2_4 | EDGE 3_4 | |
| NODE 1 | e12 | e13 | e14 | | | | e12+e13+e14 |
| NODE 2 | e12 | | | e23 | e24 | | e12+e23+e24 |
| NODE 3 | | e13 | | e23 | | e34 | e13+e23+e34 |
| NODE 4 | | | e14 | | e24 | e34 | e14+e24+e34 |
| TOTAL | | | | | | | 100% |

FIG. 15

COGNITIVE RADIO SYSTEM PROVIDING OPERATING PARAMETER CHANGES BASED UPON COGNITIVE GROUP HIERARCHY AND RELATED METHODS

TECHNICAL FIELD

This application relates to the field of communication systems, and, more particularly, to cognitive radio (CR) systems and related methods.

BACKGROUND

In some cognitive radio (CR) systems, wireless radios are able to detect wireless communications channels that are in use, and then switch to unused channels. This not only helps to avoid interference, but also allows the system to more efficiently utilize the available radio frequency (RF) spectrum.

One problem that can arise in wireless communications systems is jammers. A typical jammer is an RF transmitter that transmits signals of a relatively high power level on the same frequency as the device being jammed. This overwhelms the receiving device, such that it is unable to properly decode the received signal. In the case of CR systems, a cognitive jammer may reactively sense channels using energy detection and jam the channel using a "detect and jam" strategy, which similarly causes disruption in the communications between the legitimate transmitter-receiver pair.

Various approaches have been developed for addressing jammers in different wireless networks, including CR systems. For example, U.S. Pat. No. 8,929,936 to Mody et al. discloses a method and system of cognitive communication for generating non-interfering transmission by conducting radio scene analysis to find grey spaces using external signal parameters for incoming signal analysis without having to decode incoming signals. The cognitive communications system combines the areas of communications, signal processing, pattern classification and machine learning to detect the signals in the given spectrum of interests, extracts their features, classifies the signals in types, learns the salient characteristics and patterns of the signal and predicts their future behaviors. In the process of signal analysis, a classifier is employed for classifying the signals. The designing of such a classifier is initially performed based on selection of features of a signal detected and by selecting a model of the classifier.

Despite the existence of such approaches, further gains in jammer detection and mitigation may be desirable in various CR applications.

SUMMARY

A cognitive radio system may include a plurality of cognitive radio frequency (RF) radios and a controller configured to selectively change at least one operating parameter of the plurality of cognitive RF radios based upon a cognitive group hierarchy. The cognitive group hierarchy may include a first group based upon a signal modulation classification, a second group based upon a waveform requirement, a third group based upon an optimal cognitive RF radio path, a fourth group based upon a cognitive RF radio dynamic spectrum allocation, and a fifth group based upon frequency hopping.

In an example embodiment, the first group may perform signal modulation classification based upon a linear program. In accordance with another example implementation, the second group may define waveform requirements based upon a linear program. In some embodiments, the third group may determine an optimal cognitive RF radio path based upon a Dijkstra shortest path graph theoretic model. By way of example, the Dijkstra shortest path graph theoretic model may be based upon edge costs.

In another example implementation, the fourth group may perform cognitive RF radio dynamic spectrum allocation based upon a Shapley value game theoretic model. More particularly, the Shapley value game theoretic model may be based upon cognitive RF radio usage, for example. In one example embodiment, the fifth group may perform frequency hopping based upon a linear program.

Another aspect is directed to a controller for a cognitive radio system. The controller may include a memory and a processor cooperating with the memory to selectively change at least one operating parameter of a plurality of cognitive radio frequency (RF) radios based upon a cognitive group hierarchy. The cognitive group hierarchy may include a first group based upon a signal modulation classification, a second group based upon a waveform requirement, a third group based upon an optimal cognitive RF radio path, a fourth group based upon a cognitive RF radio dynamic spectrum allocation, and a fifth group based upon frequency hopping.

A related communication method may include operating a plurality of cognitive radio frequency (RF) radios, and selectively changing at least one operating parameter of the plurality of cognitive RF radios based upon a cognitive group hierarchy. The cognitive group hierarchy may include a first group based upon a signal modulation classification, a second group based upon a waveform requirement, a third group based upon an optimal cognitive RF radio path, a fourth group based upon a cognitive RF radio dynamic spectrum allocation, and a fifth group based upon frequency hopping.

BRIEF DESCRIPTION OF THE DRAWINGS

FIGS. 4A and 4B are tables of game theory reward matrices which may be used by the CR device of FIG. 1 in an example jammer mitigation scenario.

FIG. 15 is a table illustrating an example Dynamic Spectrum Allocation (DSA) Shapley value game theory approach which may be used for implementing the cognitive group hierarchy of FIGS. 13 and 14.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Figure 1:
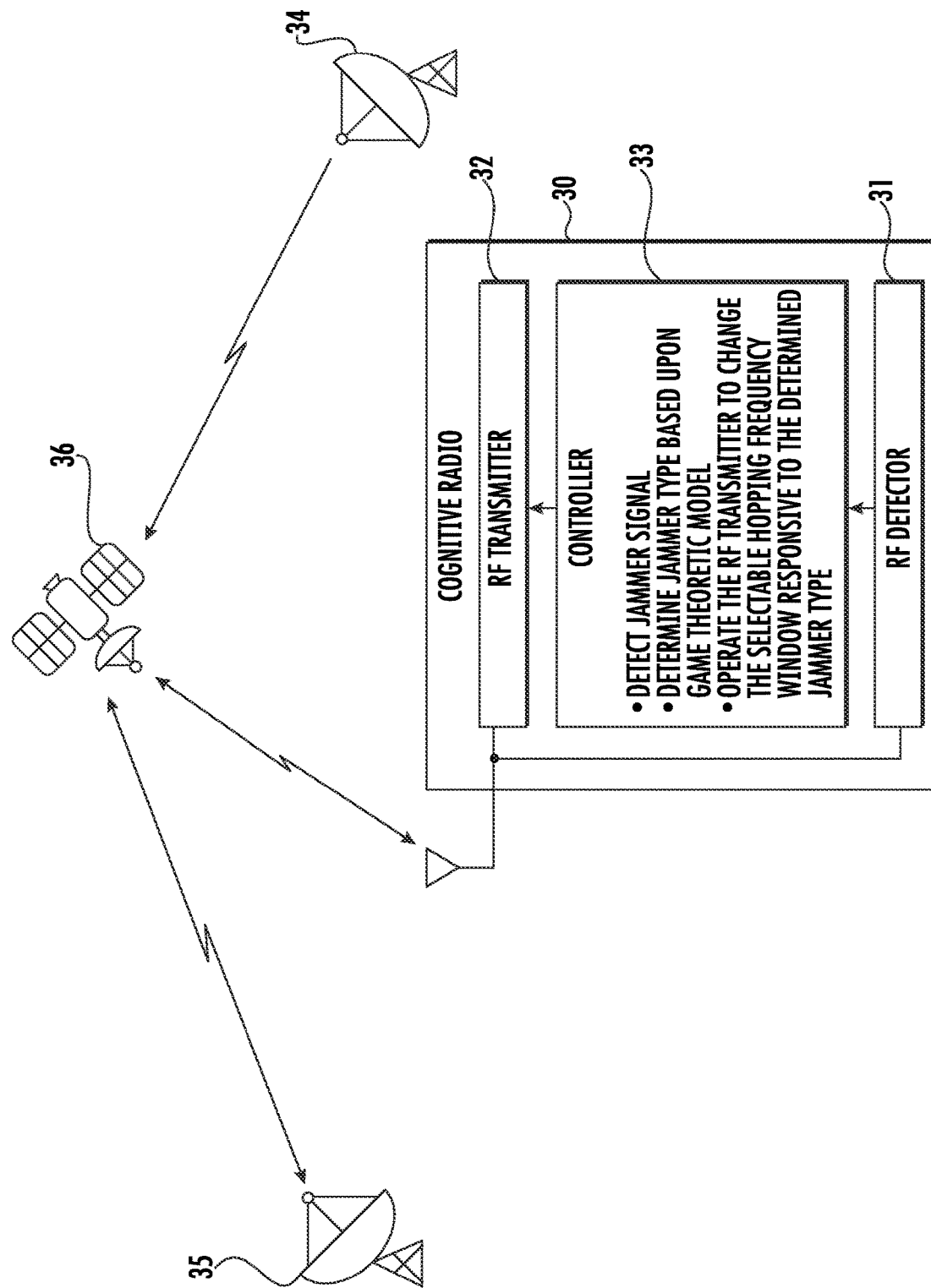
FIG. 1 is a schematic block diagram of cognitive radio (CR) device in accordance with an example embodiment providing jammer type detection based upon a game theoretic model.

Referring initially to FIG. 1, a cognitive radio (CR) device 30 illustratively includes a radio frequency (RF) detector 31, an RF transmitter 32 having a selectable hopping frequency window, and a controller 33. The controller 33 may be configured to cooperate with the RF detector 31 and RF transmitter 32 to detect a jammer signal from a jammer 34, determine a jammer type associated with the jammer signal from among a plurality of different jammer types based upon a game theoretic model, and operate the RF transmitter to change the selectable hopping frequency window responsive to the determined jammer type of the jammer signal. In the illustrated example, the CR device 30 communicates with a ground station 35 via a ground-to-air link with a satellite 36 (airplanes or other airborne platforms may also be used), although in other embodiments the CR device 31 may communicate via wireless ground-to-ground links instead of or in addition to ground-to-air links).

Figure 2:
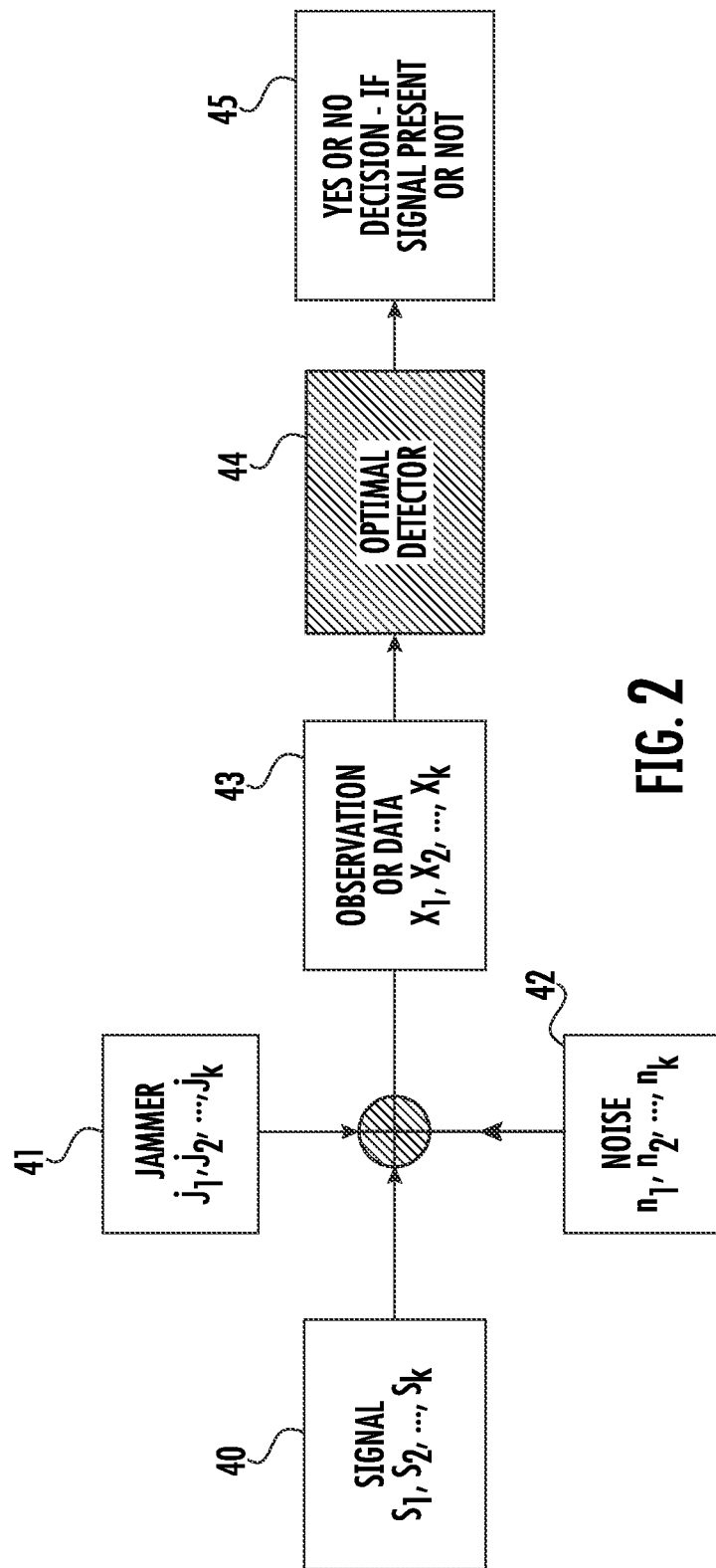
FIG. 2 is a flow diagram illustrating a Bayesian signal detection approach which may be used by the CR device of FIG. 1 in an example implementation.

Referring additionally to FIG. 2, the controller 33 formulates jamming and anti-jamming processes between legitimate satellite links and the 34 jammer using the game theoretic model as a zero-sum game. For example, the game may consider signal propagation delay, detection performance (signal detection and jamming start time) of the jammer 34, received jamming power from the jammer, and hopping and jamming costs. In the example illustrated in FIG. 2, the controller 33 receives as input observed data (Block 43) the input signal (Block 40), the jammer signal (Block 41), and noise (Block 42). An optimal detector 44 processes the observed data to produce a "yes" or "no" decision as to whether a jamming signal is present or not (Block 45).

Figure 3:
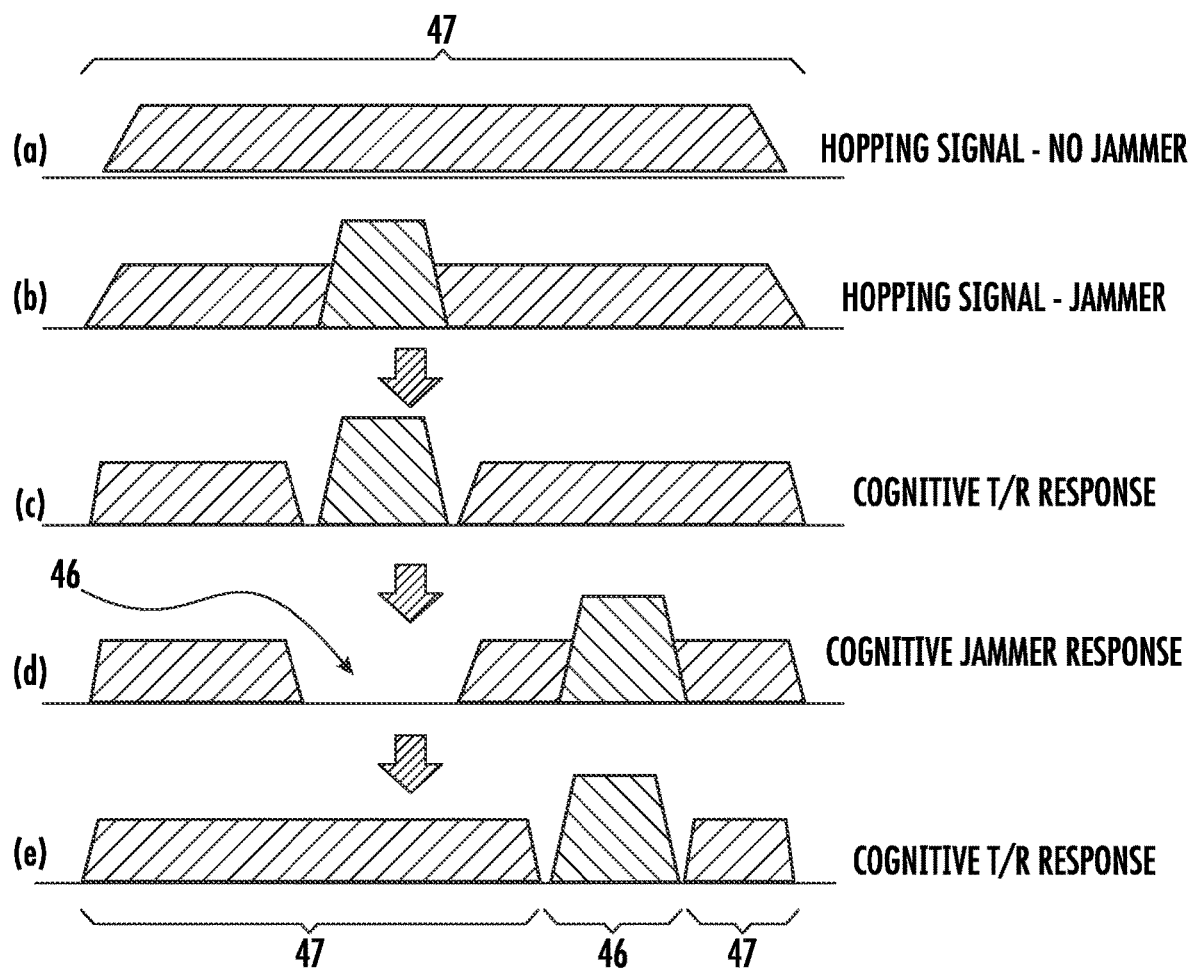
FIG. 3 is a series of radio frequency (RF) spectrum diagrams illustrating the use of keep-out zones by the CR device of FIG. 1 to mitigate a jammer in an example embodiment.

Referring additionally to FIG. 3, the controller 33 uses cognitive technologies to help make jammers irrelevant. More particularly, the controller 33 defines "keep-out zones" 46 dynamically as a jammer avoidance tool, while enabling cognitive processing to overlay existing modem processing. More particularly, a CR system may allow for transmission on any one of k channels in each time slot and frequency hopping over a side hopping bandwidth defining a selectable frequency hopping window 47 for communication at time (a). At a time (b), a partial band noise jammer jams approximately one-third of the contiguous channels at a time in a random pattern. At a time (c), the controller 33 operates the RF transmitter 32 to change the selectable hopping frequency window 47, here to exclude the third of the available channels in keep-out zone 46, responsive to the determined jammer type of the jammer signal being a partial band jammer and the history of which frequencies have been jammed or transmitted. As the cognitive jammer 34 responds to shift the frequency of the partial band jamming signal at time (d), the controller 33 changes the cognitive transmitter 32 and detector 31 response to move the keep-out zone 46 and thereby change the available hopping frequency window 47 (time (e)).

An example game theory model strategy which may be implemented by the controller 33 is now further described with reference to the reward matrices 48 and 49 of FIGS. 4A and 4B, respectively for the CR device 30 (blue player) and the jammer 34 (red player). In both reward matrices 48 and 49, the rows correspond to frequency decisions, and the columns correspond to user-selectable parameter options.

Although this overall is a two-player game, it may be separated into two individual one-player games. Each individual game becomes a "game against the environment (nature)", where the environment is influenced by the actions of the other player. The environment here is the electromagnetic spectrum. Red strategy #1 is an equal energy across the band control, which provides no advantage to the blue player using keep-out zones. Red strategy #2 is the slowly moving jammer, to which the blue player places keep-out zones to minimize jamming (maximize throughput). Red strategy #3 is based on observed blue player frequency occupancy. The blue player still places a keep-out zone to minimize jamming (maximize throughput), and attempts to close the loop faster. The use of probabilistic predictions and game theory is characterized by the need to compute expected utilities for mutually exclusive objectives to optimize performance.

Figure 5:
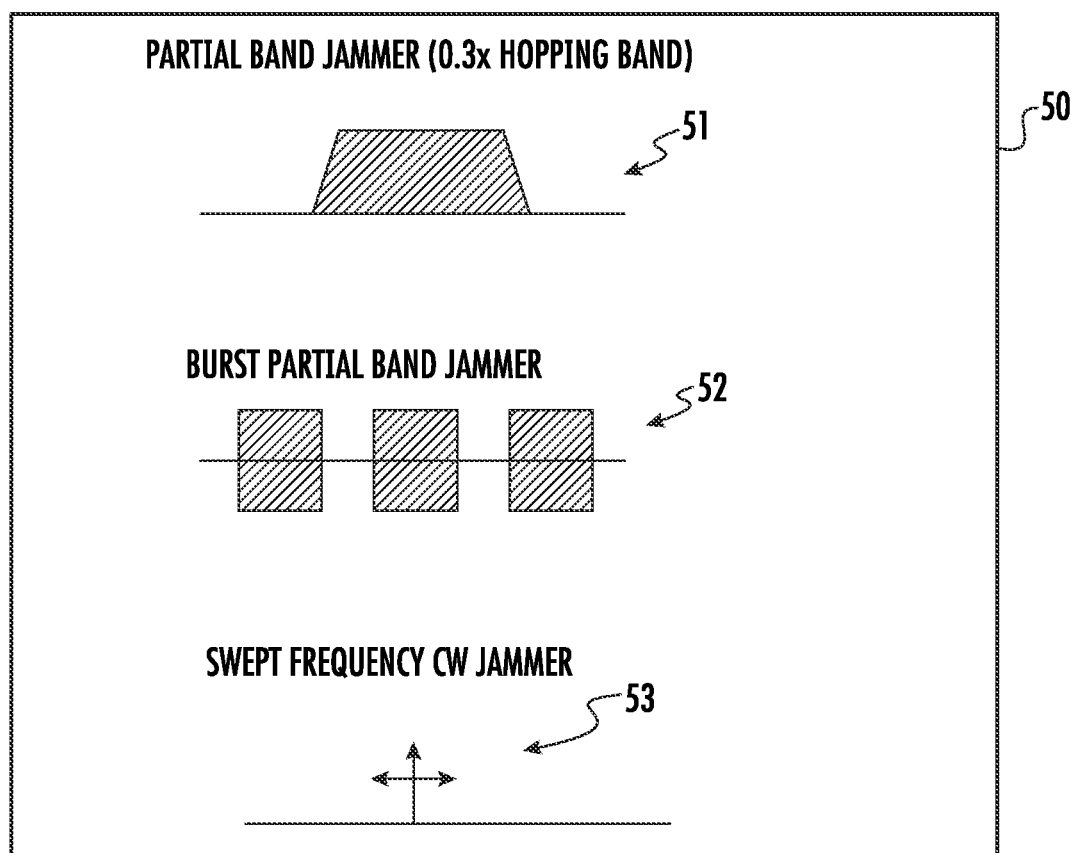
FIG. 5 is a series of schematic diagrams illustrating different jammer types which may be detected by the CR device of FIG. 1 in an example implementation.

A signal diagram 50 of FIG. 5 notionally illustrates three different jammer types that were modeled in an example simulation of the CR radio 30. The example assumes perfect knowledge of the jamming signal with an input signal-to-noise ratio (SNR). The jamming signal is modeled as a partial band jammer 51, burst partial band jammer 52, or swept frequency jammer 53. For partial band jammers 51, one-third of the spectrum is jammed. There is an option for the jammer to perform a modulus wrap-around the spectrum such that some low and high frequencies are jammed simultaneously.

Figure 6B:
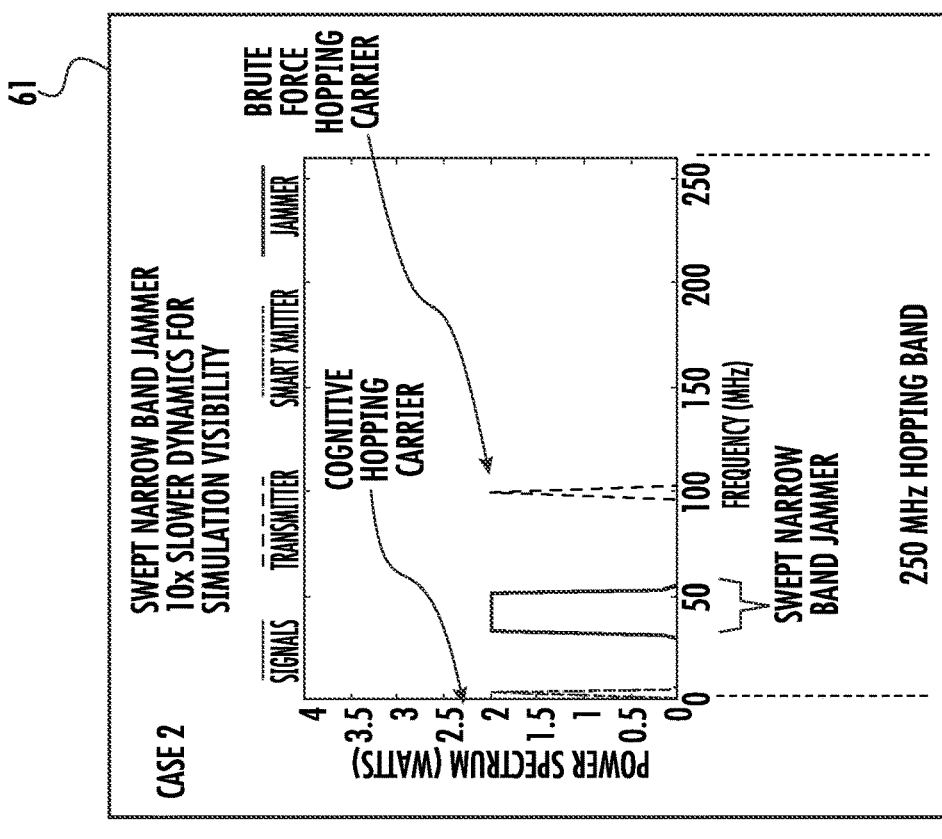
FIGS. 6A and 6B are graphs of the simulated partial band and swept narrow band jammers of FIG. 5, respectively.
Figure 6A:
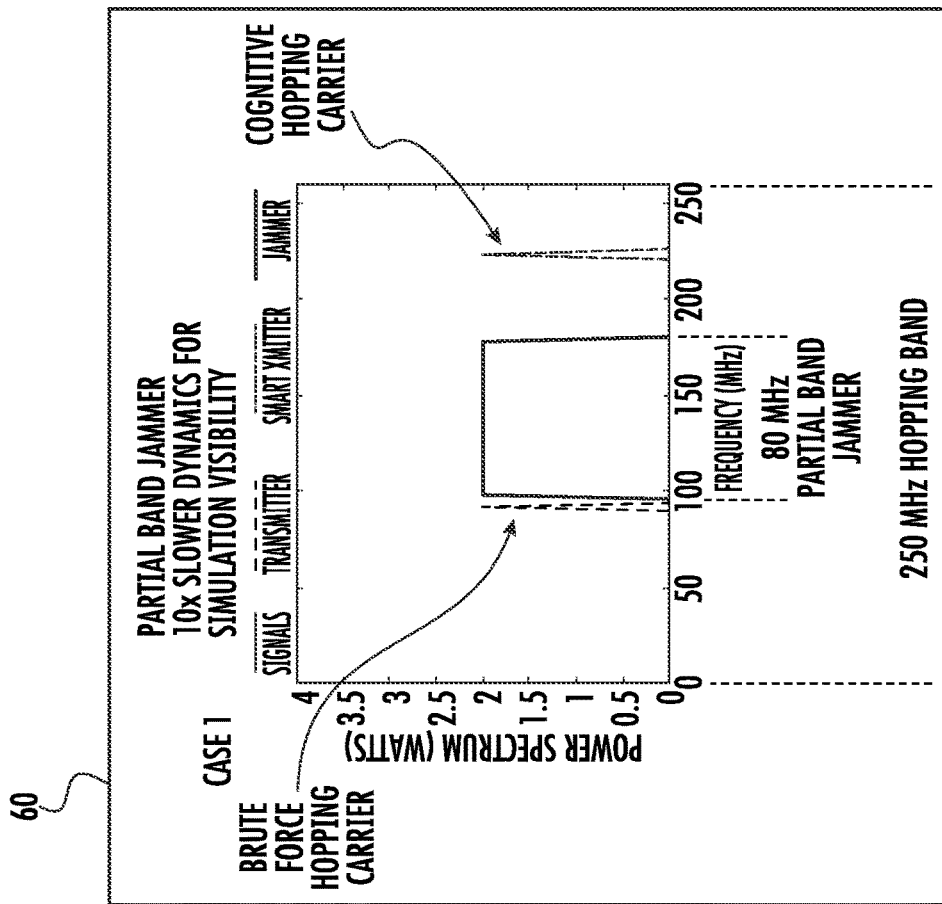

Referring to the graphs 60 and 61 of FIGS. 6A and 6B, respectively, simulated partial band jammer and swept narrow band jammers are shown. The partial band jammer is represented as maximally effective partial band noise (0.3× hopping band), while the swept jammer is modeled as a swept narrow band jammer for simulation visibility.

Figure 7:
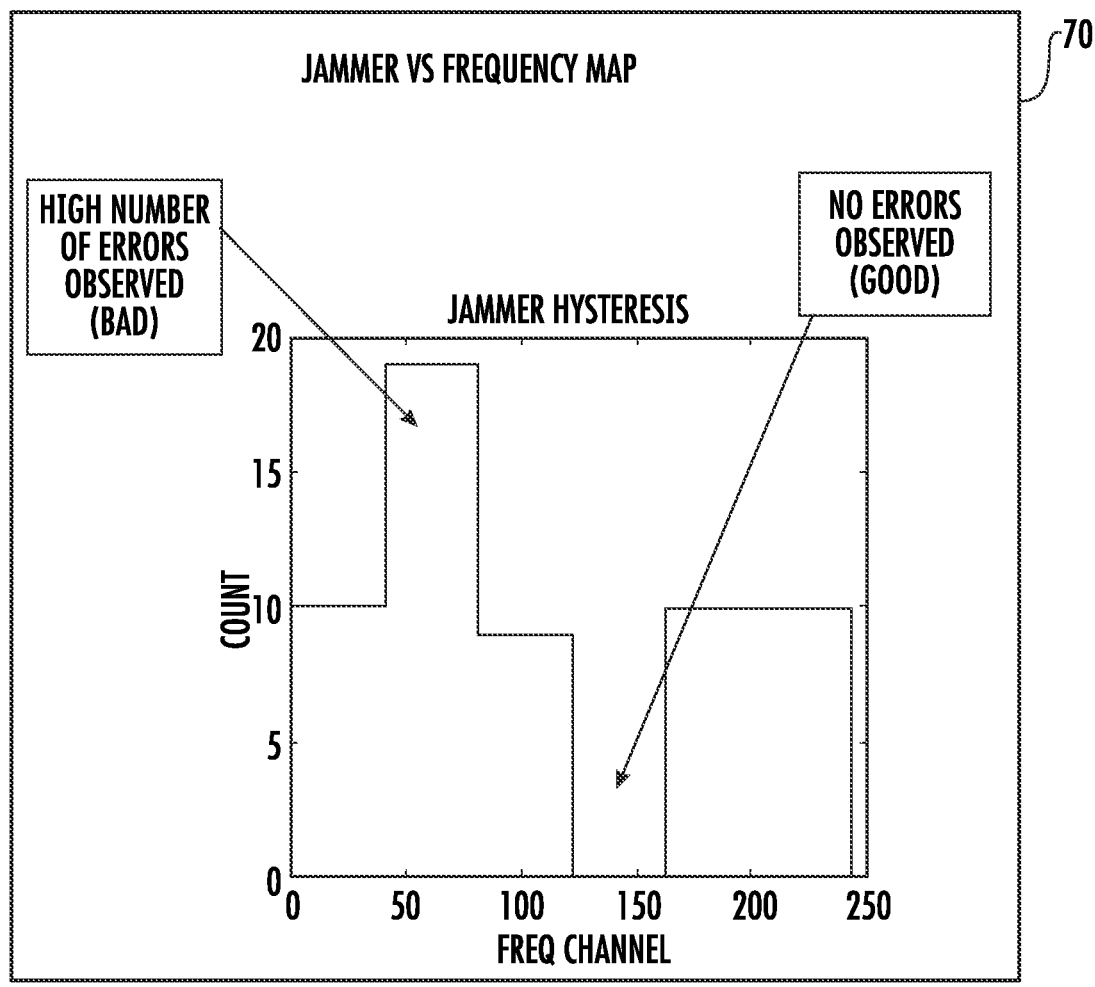
FIG. 7 is a graph of jammer vs. frequency map illustrating how a history of jammed frequencies may be modeled as hysteresis by the CR device of FIG. 1.
Figure 8A:
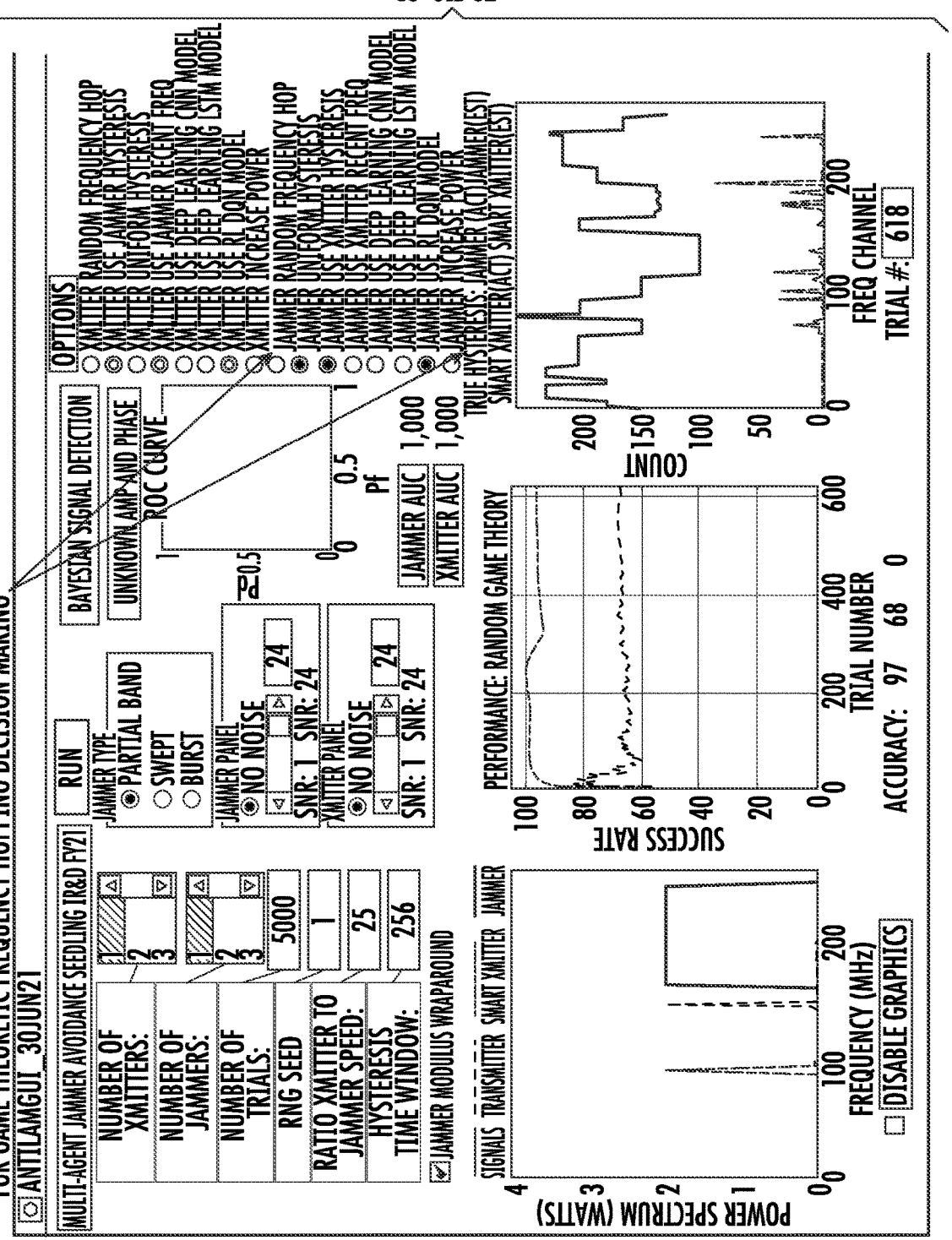
FIG. 8 is a screen print of a display and associated controls for a simulated example embodiment of the CR device of FIG. 1.
Figure 8B:
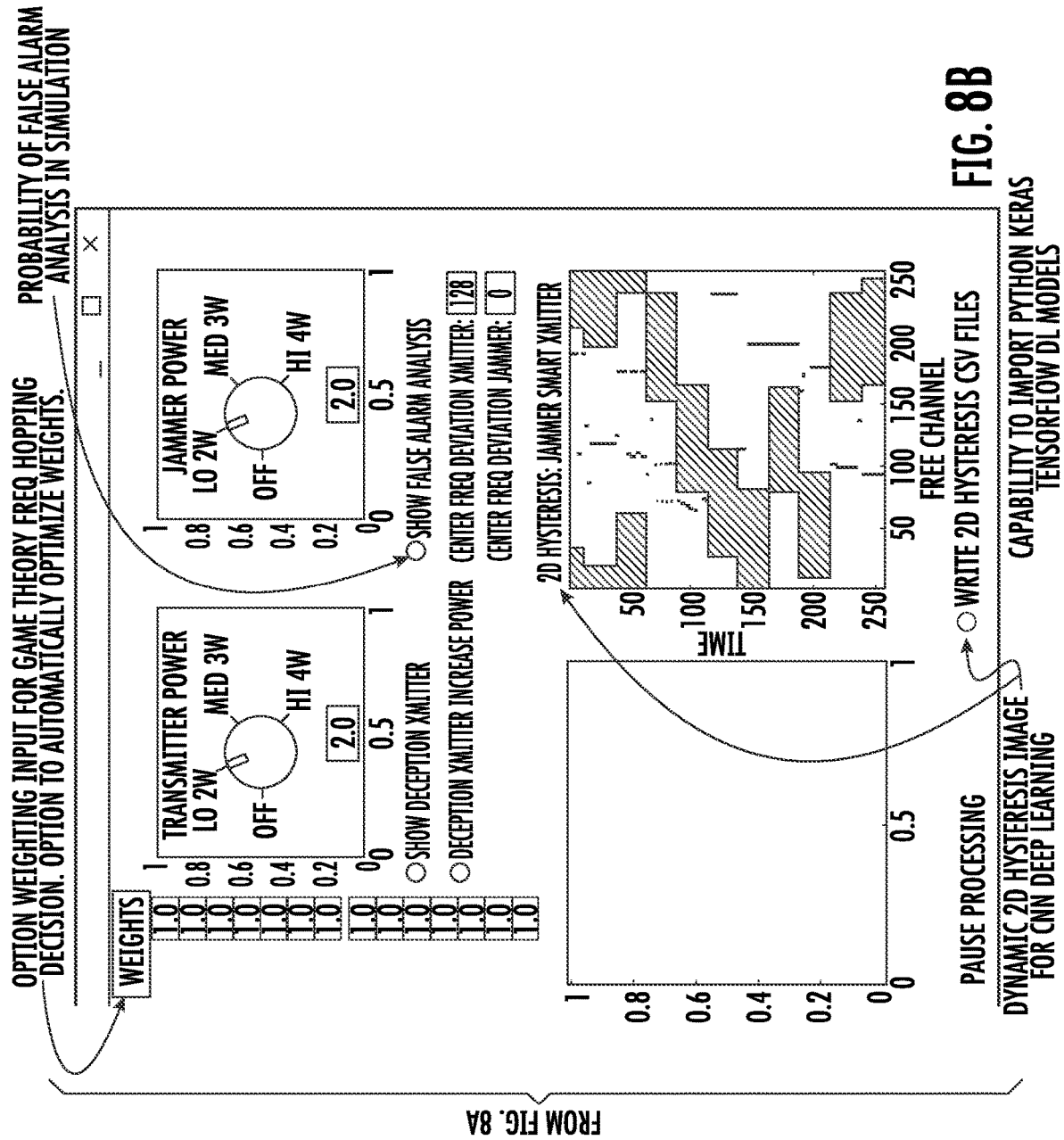

Referring additionally to the graph 70 of FIG. 7, for the simulation knowledge of jammer history was used as first step for simulation, and errors were assumed when the jammer was coincident with a hopping carrier. The memory or history of which frequencies have been jammed or transmitted is modeled as hysteresis as shown in the graph 70. Example simulation controls and display are shown in the screen print 80 of FIG. 8. The simulation allows for the inclusion of anti-jamming modem system aspects, including multiple jammers/jammer types, as well as dynamic/stochastic jammer type selection.

Using the above-described approach, the controller 33 may advantageously apply cognitive processing and frequency hopping keep-out zones 46 to mitigate jammer effectiveness. This approach allows for the use a dynamic reward matrix of varying size, in which the rows are frequency decisions and the columns are user-selectable parameter options. Dynamic optimal weighting may be based on user-selectable parameter options using Q-Learning, for example. The controller may also use spectrum hysteresis as a parameter for transmitter and jammer games. This approach also provides a number of other technical advantages, including: use of frequency keep-out zones with a linear program; use of deception with varying power; use of Bayesian signal detection to determine presence of a jammer signal; use of a variable time hysteresis time window; use of variable transmitter and jammer speeds; use with multiple transmitters and jammers; use with multiple jammer types; and use with multiple signal-to-noise ratios.

The present approach also advantageously allows for cognitive anti-jam modem analytics to be used to increase signal throughput of a legitimate transmitter-receiver link. Current anti-jamming techniques may attempt to mitigate jamming by frequency spreading alone. However, significant additional gains may be achieved through a dynamic response to jammer changes and a cognitive processing loop as described above.

Figure 9:
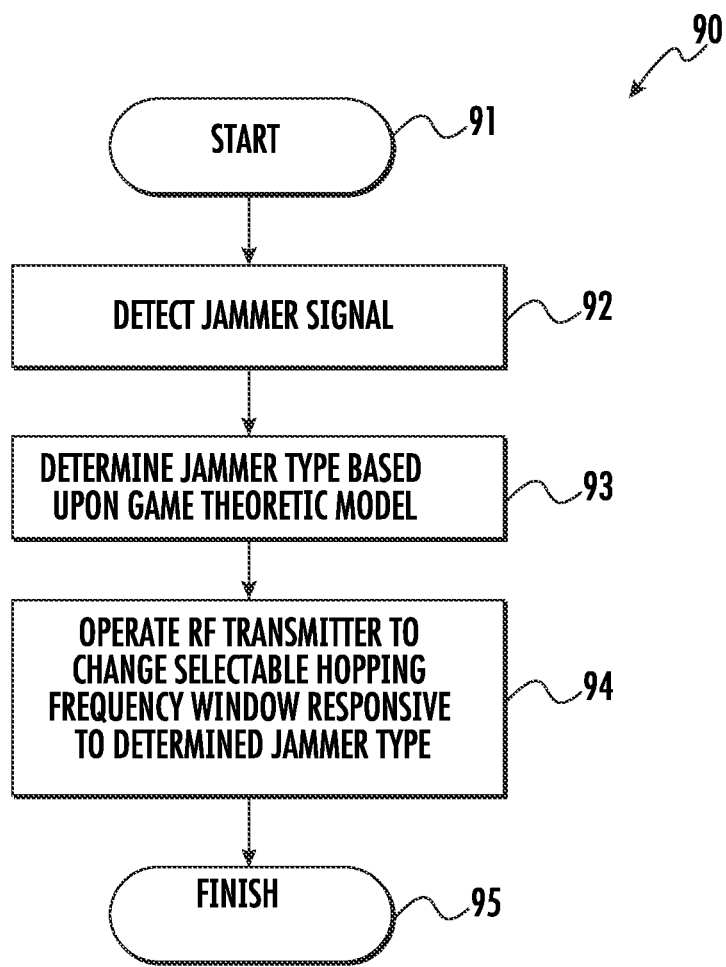
FIG. 9 is a flow diagram illustrating method aspects associated with the CR device of FIG. 1.

Turning to the flow diagram 90 of FIG. 9, beginning at Block 91, a related method for using the cognitive radio device 30 illustratively includes detecting a jammer signal from the RF detector 31 (Block 92), determining a jammer type associated with the jammer signal from among a plurality of different jammer types based upon a game theoretic model (Block 93), and operating the RF transmitter 32 to change a selectable hopping frequency window 47 of the RF transmitter responsive to the determined jammer type of the jammer signal (Block 94), as discussed further above. The method of FIG. 9 illustratively concludes at Block 95. In addition, a non-transitory computer-readable medium may have computer-executable instructions for causing the cognitive radio device to perform steps including detecting a jammer signal from the RF detector, determining a jammer type associated with the jammer signal from among a plurality of different jammer types based upon a game theoretic model, and operating the RF transmitter to change a selectable hopping frequency window of the RF transmitter responsive to the determined jammer type of the jammer signal.

Figure 10:
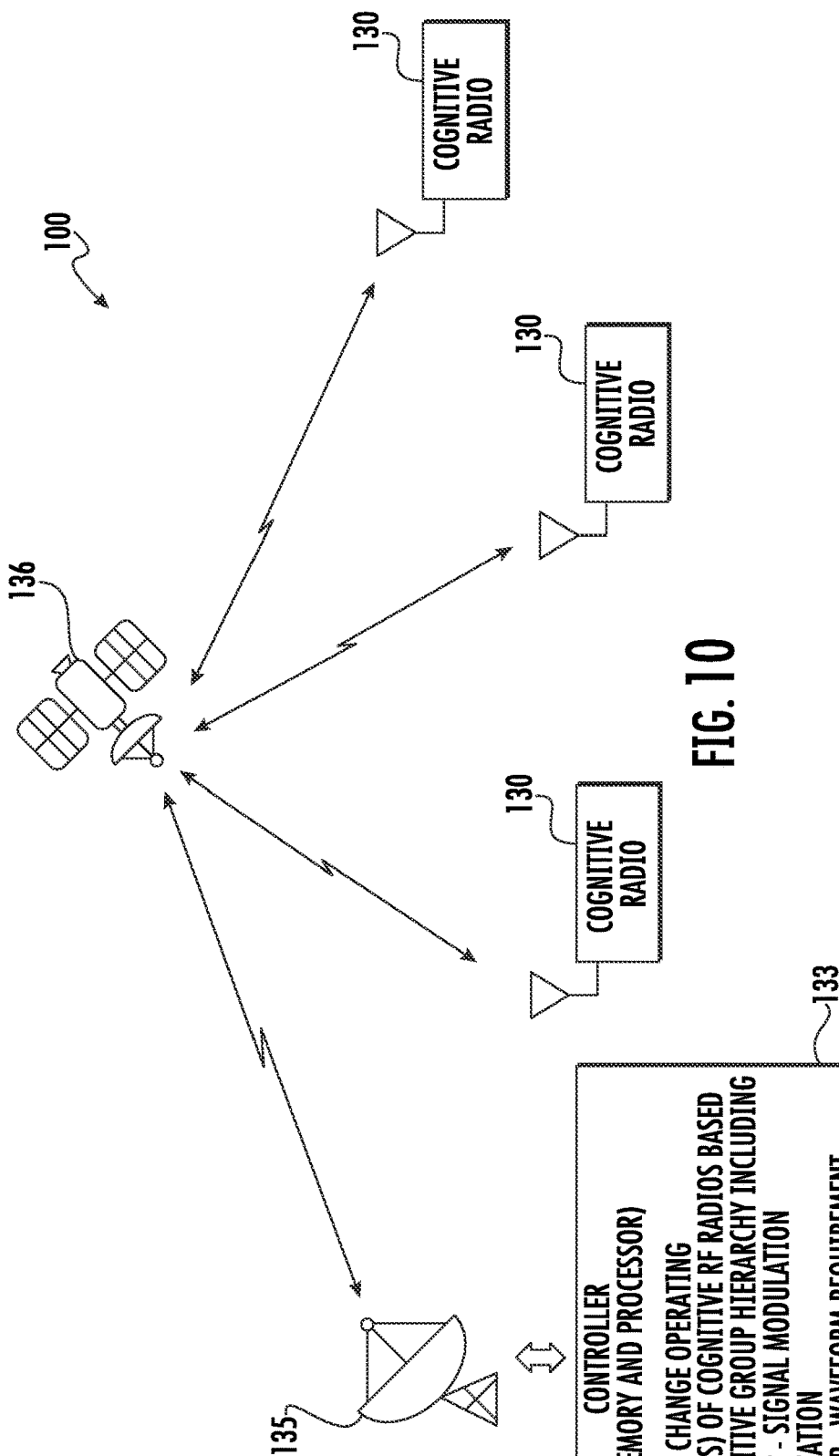
FIG. 10 is schematic block diagram of a cognitive radio system in accordance with an example embodiment providing for operating parameter changes based upon a cognitive group hierarchy.

Turning now to FIG. 10, in another example implementation a cognitive radio system 100 illustratively includes a plurality of cognitive RF radios 130 and a controller 133 at a base station 135 configured to selectively change at least one operating parameter of the plurality of cognitive RF radios (e.g., power, frequency, communication time slot, etc.) based upon a cognitive group hierarchy. As in the example described above, the illustrated cognitive radio system 100 communicates via satellites 136, although ground-to-ground wireless links may be used instead or in addition to satellite communication in various embodiments. As will be discussed further below, the cognitive group hierarchy includes a first group based upon a signal modulation classification, a second group based upon a waveform requirement, a third group based upon an optimal cognitive RF radio path, a fourth group based upon a cognitive RF radio dynamic spectrum allocation, and a fifth group based upon frequency hopping.

By way of background, as cognitive emitters (e.g., cognitive wireless networks, cognitive radars, cognitive sensor networks, cognitive wireless networks, cognitive sensor networks, etc.) become more prevalent in various application spaces, there will be increased competition for the same electromagnetic (EM) spectrum. As a result, cognitive system components may be coordinated in such a way as to optimize performance. Here again, this may come with a need to counter evolving jammer capability via cognitive anti-jam modem analytics and techniques to increase signal throughput of legitimate transmitter receiver links, as noted above.

Figure 11:
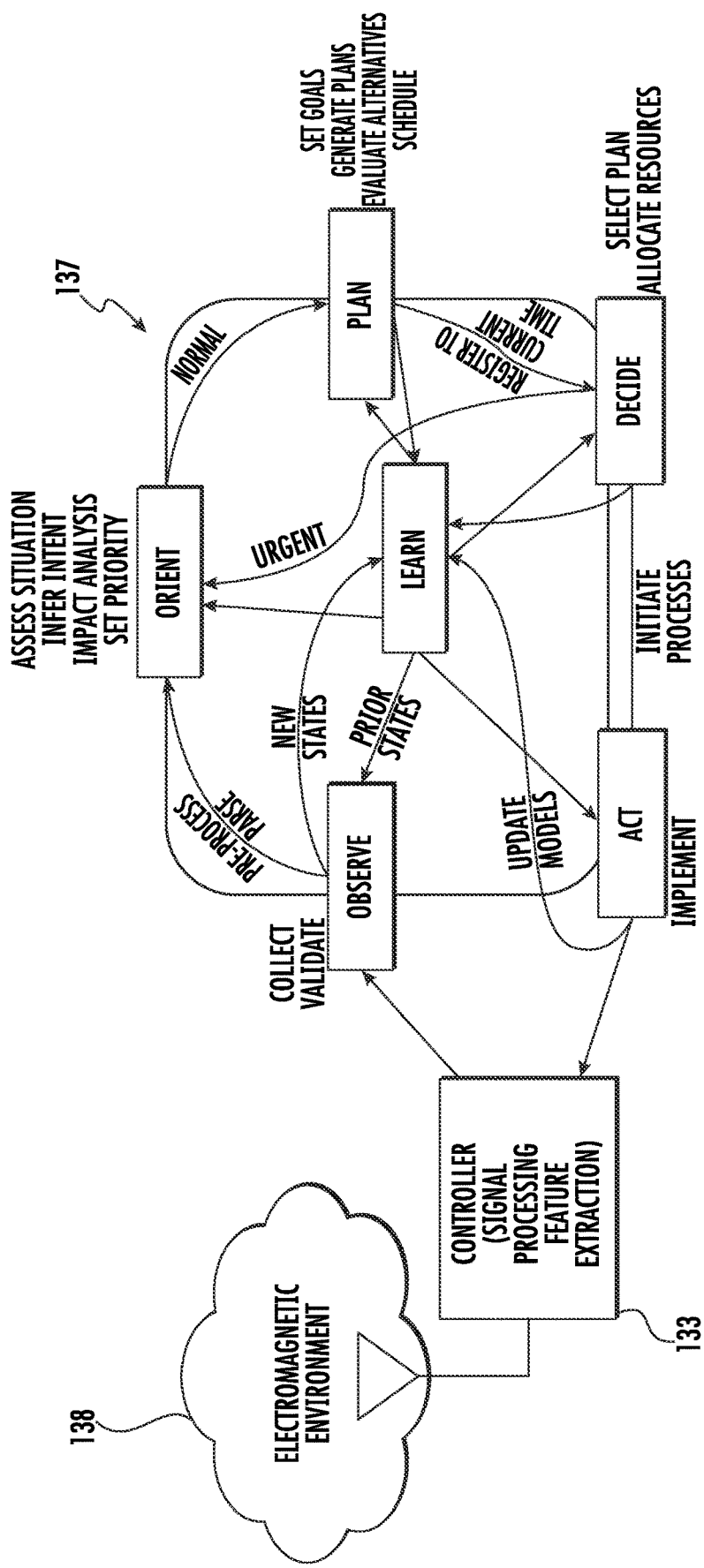
FIG. 11 is a schematic block diagram illustrating Observe, Orient, Plan, Decide, Act, and Learn (OOPDAL) loop processing operations which may be performed by the controller of the system of FIG. 10.

Referring additionally to FIG. 11, the controller 133 may advantageously implement an Observe, Orient, Plan, Decide, Act, and Learn (OOPDAL) loop 137 to learn from and react to its electromagnetic environment 138. It should be noted that some of the illustrated processes may be distributed across multiple cognitive radios 130 (also referred to as "nodes") sharing a common objective in some embodiments, and that the controller 133 may also be distributed (e.g., as in a cloud computing configuration). The controller 133 illustratively includes a processor and a memory associated therewith.

An example implementation of the controller 133 is now described with reference to FIG. 12. The controller 133 illustratively includes a variational autoencoder (VAE) 139, which in turn includes an encoder 140 which learns to compress (reduce) a batch of input images 144 into an encoded representation of a normal distribution in latent space provided by a neural network 142 (e.g., a convolutional neural network, CNN). A decoder 143 learns to reconstruct the original data from the encoded representation to be as close to the original input as possible. The latent space is the layer that contains the compressed representation of the input data.

The VAE 139 differs from regular autoencoders in that it does not use the encoding-decoding process simply to reconstruct an input. Instead, the VAE 139 imposes a probability distribution on the latent space and learns the distribution so that the distribution of the outputs from the decoder 143 matches that of the observed data. The VAE 139 assumes that the source data has some sort of underlying probability distribution (such as Gaussian) and then attempts to find the parameters of the distribution.

The controller 133 advantageously provides an effective way to generate synthetic data for training machine learning (ML) applications, such as anomaly detection. In particular, this may be done while maintaining the underlying statistical properties of the original dataset, it may be applicable to sensitive datasets where traditional data masking falls short of protecting the data, and it may provide faster methods of generating synthetic training data for ML applications.

By way of background, a VAE is a generative system and serves a similar purpose as a generative adversarial network. One main use of a VAE is to generate new data that is related to the original source data by sampling from the learned distribution. Utilizing the learned distribution provides a way of generating synthetic data that is reflective of naturally occurring variations, rather than simply replicating existing data samples. This new synthetic data may be utilized for additional training and testing analysis. Moreover, a VAE is a generative model which may randomly generate new samples based on the learned distribution. However, unlike traditional generative models that require strong assumptions regarding data structures and long inference times, a VAE makes weak assumptions of the data which also leads to faster training.

The VAE 139 forces input images onto an n-dimensional probability distribution (e.g., a 20-dimensional Gaussian in the present example), learns the associated parameters (e.g., the means and variances for a Gaussian distribution), and describes the data seen on an antenna with the resulting distribution. Synthetic data samples may be randomly generated from a probability distribution in latent space once the associated parameter value vectors are calculated.

The controller 133 may utilize a two-step process to generate synthetic data samples by (1) using the VAE 139 to learn the statistical properties of the original dataset(s) sampled from the ODD; and (2) using the processor 150 as an optimizer for sampling the learned distribution and applying algorithmic transformations (e.g., rotations, reflections and attenuation) that enable building of richer datasets to support the ML model Verification and Validation (V&V) process. More particularly, this approach provides an enhanced VAE-based process flow to learn the distribution and associated statistical properties of the original dataset (ideally the distribution of data in the ODD). Input data is provided, which in the present example includes antenna gain pattern images 144, and a subset or mini batch is selected at random.

Generally speaking, input data may come from signals or other data that is converted to 2D imagery to leverage the convolutional neural network(s) 142 which underlies the VAE 139. The input data can represent any aspect or aspects of one or more devices and/or processes of a distributed system of interest. In the example of a computer network, the data include overall network performance, individual device performance, performance of multiple devices clustered together, usage parameters such as bandwidth usage or CPU (central processing unit) usage, memory usage, connectivity issues, Wi-Fi coverage, cellular signal, syslog, Netflow, data logs, intrusion detection system alerts and more. In the example of the CR system 100, the input data may include gain patterns images corresponding to respective CR radios 130, for example.

For image-based inputs, an image gradient Sobel edge detector may be used as a pre-processing step. This preprocessing step helps the Deep Learning Convolutional Neural Network models to learn more quickly and with more accuracy. Next, the data is provided to the encoder 140 of the VAE 139. The encoder 140 forces the input data (images 144) onto the multidimensional probability distribution. In the present example, this is a 20-dimensional multivariate Gaussian distribution, although other distributions and dimensions may be utilized in different embodiments. The VAE 139 learns the means and variances of the data, and the resulting distribution describes the data.

The encoder 140 generates a compressed representation of the input data utilizing various weights and biases. Weights are the parameters within the neural network 142 that transform input data within the network's hidden layers. Generally speaking, the neural network 142 is made up of a series of nodes. Within each node is a set of inputs, weight, and a bias value. As an input enters the node, it gets multiplied by a weight value, and the resulting output is either observed or passed to the next layer in the neural network 142. The weights of the neural network 142 may be included within the hidden layers of the network. Within the neural network 142, an input layer may take the input signals and pass them to the next layer. Next, the neural network 142 includes a series of hidden layers which apply transformations to the input data. It is within the nodes of the hidden layers that the weights are applied. For example, a single node may take the input data and multiply it by an assigned weight value, then add a bias before passing the data to the next layer. The final layer of the neural network 142 is known as the output layer. The output layer often tunes the inputs from the hidden layers to produce the desired numbers in a specified range.

Weights and bias values are both learnable parameters inside the network 142. The neural network 142 may randomize both the weight and bias values before learning initially begins. As training continues, both parameters may be adjusted toward the desired values and the correct output. The two parameters differ in the extent of their influence upon the input data. At its simplest, bias represents how far off the predictions are from their intended value. Biases make up the difference between the function's output and its intended output. A low bias suggests that the network 142 is making more assumptions about the form of the output, whereas a high bias value makes less assumptions about the form of the output. Weights, on the other hand, can be thought of as the strength of the connection. Weight affects the amount of influence a change in the input will have upon the output. A low weight value will have no change on the input, and alternatively a larger weight value will more significantly change the output.

The compressed representation of the input data is called the hidden vector. The mean and variance from the hidden vector are sampled and learned by the CNN 142. Principal component analysis (PCA) of the hidden vector allows for the visualization of n-dimensional point clusters, e.g., 3-D point clusters, in the latent space. To make calculations more numerically stable, the range of possible values may be increased by making the network learn from the logarithm of the variances. Two vectors may be defined: one for the means, and one for the logarithm of the variances. Then, these two vectors may be used to create the distribution from which to sample.

The decoder 143 generates synthetic output data. The processor 150 functions as an optimizer which uses an ensemble of solvers 145-147 with a game theoretic implementation to create an output image with least image reconstruction error. An input module 148 computes a gradient of loss function from the synthetic output data, and an output module 149 picks the best update based upon the solvers 145-147. More particularly, the optimizer process is iterated via reparameterization to handle sampling of the hidden vector during backpropagation (an algorithm for training neural networks). In the illustrated example, an ensemble of models is generated using the three different solvers, namely an Adam solver 145, a Stochastic Gradient Descent with Momentum (SGDM) solver 146, and a Root Mean Squared Propagation (RMSProp) solver 147, although different solvers may be used in different embodiments. The values from the loss function (evidence lower bound or ELBO, reconstruction, and Kullback-Leibler or KL loss) may be used in a game theoretic implementation to determine the optimal model to use per test sample. The loss is used to compute the gradients of the solvers.

Figure 12:
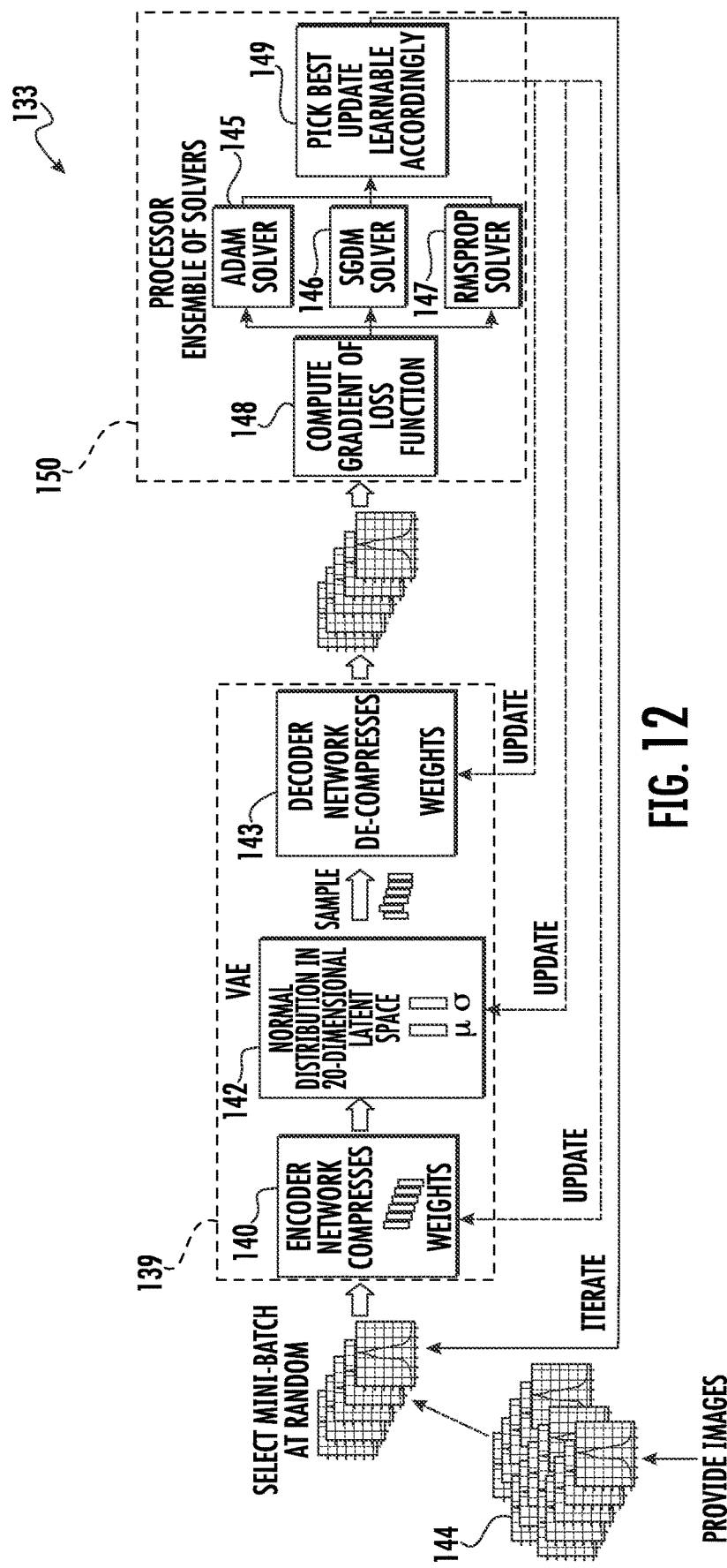
FIG. 12 is a schematic block diagram of an example implementation of the controller of the system of FIG. 10.

To summarize, the controller 133 illustrated in FIG. 12 performs the following steps:
   a) Providing input image data representative of the operational design domain to the encoder 140 of the VAE 139;
   b) Compressing the input image data using a first set of weights with the encoder;

c) Creating a normal distribution of the compressed image data in a latent space of the VAE;
d) Decompressing the compressed image data from the latent space using a second set of weights with the decoder 143 of the VAE;
e) Optimizing the decompressed image data from the decoder, which may further include (i) generating multiple probabilistic models of the decoded image data, and (ii) determining which of the multiple models is optimal by applying a game theoretic optimization to select which model to use;
f) Updating at least the first and second set of weights based on the loss detected in the optimized decompressed image data, which may include (i) applying a game theoretic optimization to the models; and (ii) selecting which model (e.g., Adam, SGDM, or RMSProp) to use to update the first and second sets of weights; and
g) Iterate steps b)-f) until the decompressed image data possesses substantially the same statistical properties as the input image data (such statistics include ELBO loss, which is reconstruction loss plus KL loss).

Steps b)-f) may be iterated until the error does not statistically decrease and validation patience is achieved (i.e., the number of times that the validation loss can be larger than or equal to the previously smallest loss before network training stops).

Once the latent space distribution of the original dataset has been learned/optimized, synthetic datasets may be generated. For example, a sample may be randomly generated from the learned distribution in latent space. Next, the decoder 143 may be applied to the sample to generate a new datum. Afterwards, algorithmic transformations may be applied, as appropriate, to generate additional data points for the validation test dataset. Such transformations may include attenuation, reflecting or rotating images. Multiple transformations may be applied to a single sample from the latent space distribution, to quickly increase the size of a synthetic dataset.

Figure 13:
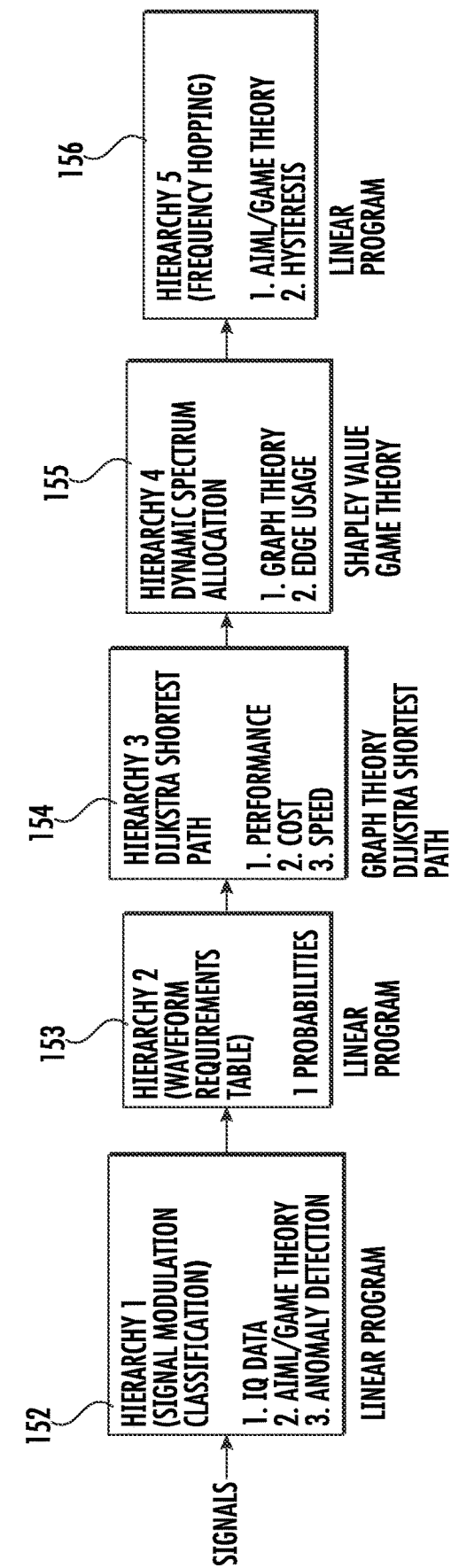
FIG. 13 is a flow diagram illustrating an example implementation of the cognitive group hierarchy used by the controller of the system of FIG. 10.
Figure 14:
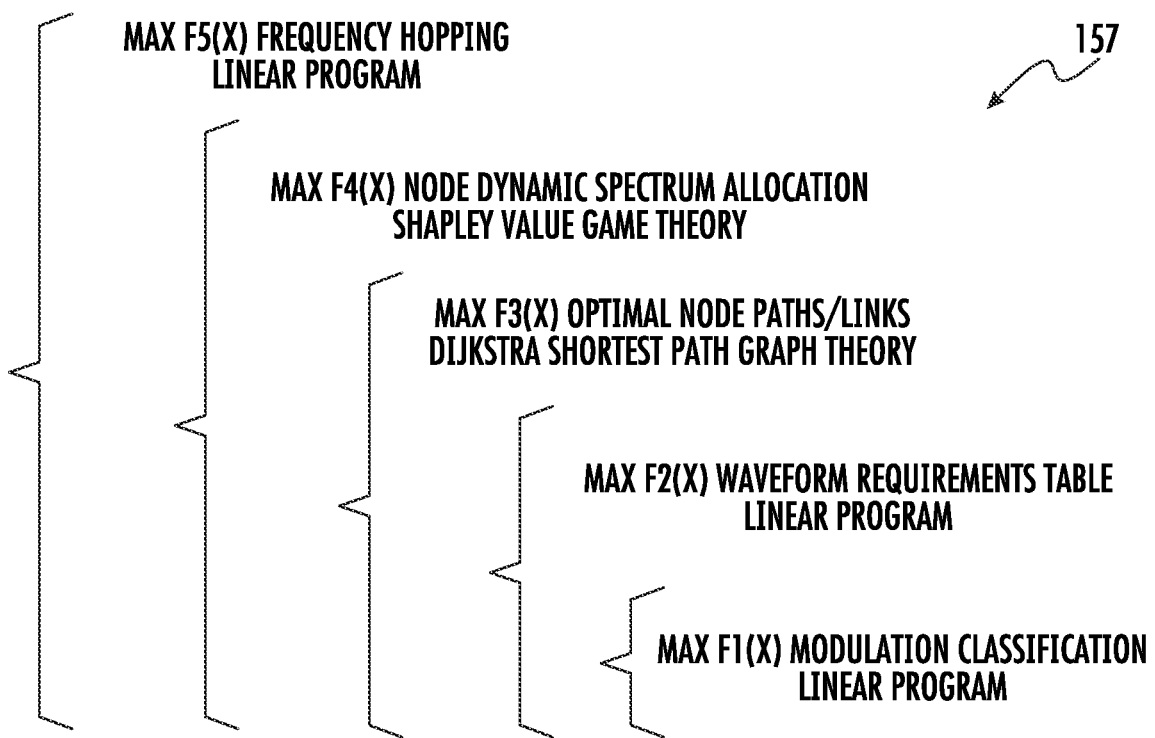
FIG. 14 is another diagram illustrating the cognitive group hierarchy of FIG. 13.

Referring additionally to the flow diagram 151 of FIG. 13 and the schematic hierarchy diagram 157 of FIG. 14, an example implementation of the cognitive group hierarchy used by the controller 133 for changing operating parameters of the cognitive radios 130 is now described. At a first level or group of the hierarchy (Block 152), signal modulation classification may be performed based upon a linear program. For example, this may be based upon IQ data and utilize the AIML/game theory and anomaly detection approach described above with reference to FIG. 12. The second group (Block 153) defines waveform requirements for the given scenario. The controller 133, which may be supplied with a list of available waveforms for use, and Block 153 selects the appropriate waveform for the next data transmission. Block 153 may select a waveform via a linear program seeded with applicable communications performance metrics such as message transmission probabilities. The list of available waveforms and associated metrics may be reduced from the full set of waveforms based on the waveforms detected in Block 152. Furthermore, in a network of cognitive radios 130, the third group (Block 154) determines an optimal cognitive RF radio path based upon performance, cost (e.g., edge costs), and speed variables, e.g., using a Dijkstra shortest path graph theoretic model. The performance metrics, costs, and/or variables utilized by Block 154 are determined based upon the waveform requirements defined in Block 153. The fourth group (Block 155) may perform cognitive RF radio dynamic spectrum allocation based upon graph theory and/or edge usage, such as with a Shapley value game theoretic model. Furthermore, the fifth group (Block 156) may perform frequency hopping based upon AIML/game theory and/or hysteresis (see FIG. 7) and a linear program. In a network of cognitive radios 130, the appropriate input metrics for frequency hopping such as hysteresis may depend on spectrum allocation allotted by Block 155. Outputs from each stage of the system are fed into the following stage in the hierarchy for automated decision making.

Referring additionally to the table 158 of FIG. 15, an example Dynamic Spectrum Allocation (DSA) Shapley value game theory approach is now described. For every possible start and end node, a Dijkstra shortest distance is calculated based on edge costs (reciprocal of free space path loss). A cumulative jamming penalty may be added to edge costs based on a probability of jamming. The DSA Shapley value may be based upon node usage, since a higher cost discourages use of the path as well as the node. Higher usage deserves more spectrum, and a different frequency may be assigned to each link connection in the path.

The above-described approach accordingly provides a game theoretic based supervisor (which may be centralized but with some operations distributed among the system 100 as noted above) which ingests environmental status and the requirements of all legitimate cognitive radios 130, and constantly prioritizes each cognitive radio and adjusts operating parameters accordingly. The above-described approach further provides for enhanced signal classification using different supervised learning algorithms, taking the best of the best per observation; use of game theory to choose which machine learning model to optimally use per observation; enhanced signal classification using multiple CNN channels; and a method for optimally determining new signals by modulation classification from an ensemble of models.

Further technical advantages of the system 100 and controller 133 may include the following: application of cognitive processing and frequency hopping keep-out zones to mitigate jammer effectiveness; use of a dynamic reward matrix of varying size based on user choices as user selectable option in simulation in which rows are frequency decisions and columns are user selectable parameter options; dynamic optimal weighting based on user selectable parameter options using Q-Learning; use of spectrum hysteresis as a parameter for transmitter and jammer; use of frequency keep-out zones in a linear program; use of deception with varying power; use of Bayesian signal detection to determine the presence of jammer signal; use of a variable time hysteresis time window; use of variable transmitter and jammer speeds in simulation; and the ability to incorporate multiple transmitters and jammers, multiple jammer types, and multiple signal-to-noise ratios.

Figure 16:
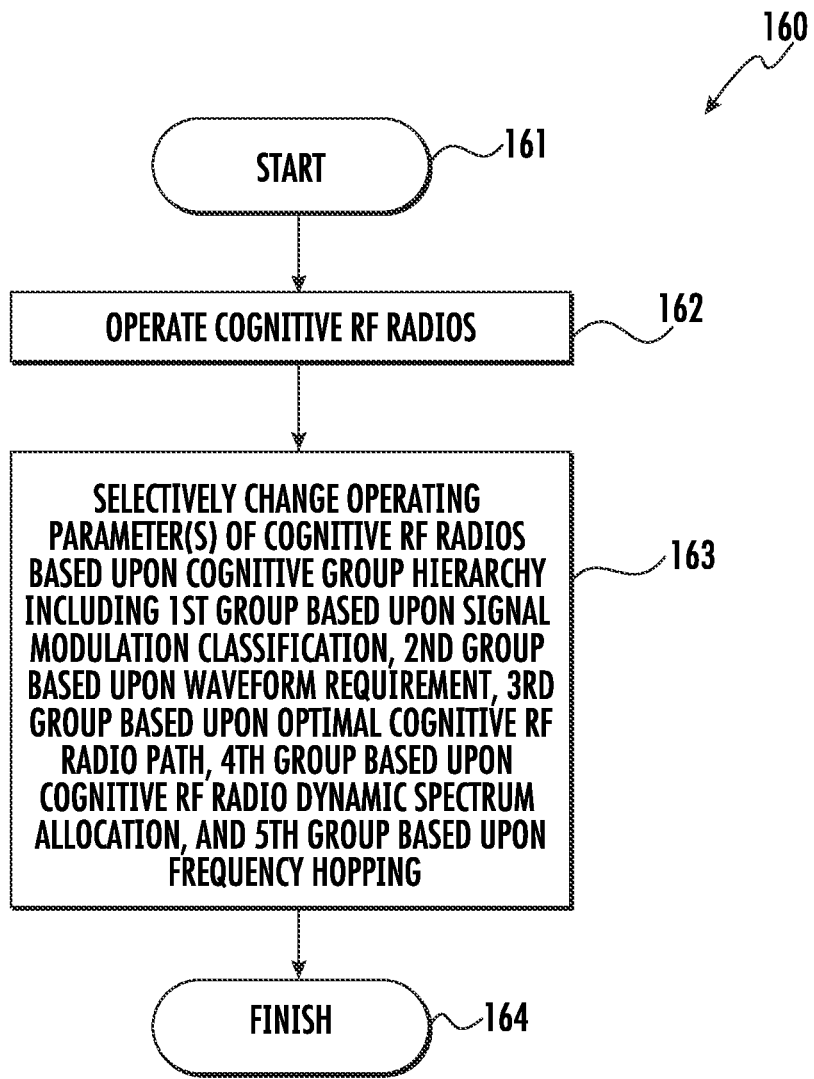
FIG. 16 is a flow diagram illustrating example method aspects associated with the cognitive radio system of FIG. 10.

Turning now to the flow diagram 160 of FIG. 16, beginning at Block 161, a related method may include operating a plurality of cognitive RF radios 130, at Block 162, and selectively changing at least one operating parameter of the plurality of cognitive RF radios based upon a cognitive group hierarchy, at Block 163. As noted above, the cognitive group hierarchy may include a first group based upon a signal modulation classification, a second group based upon a waveform requirement, a third group based upon an optimal cognitive RF radio path, a fourth group based upon a cognitive RF radio dynamic spectrum allocation, and a fifth group based upon frequency hopping. The method of FIG. 16 illustratively concludes at Block 164.

This application is related to copending patent application entitled, "COGNITIVE RADIO PROVIDING JAMMER TYPE DETECTION BASED UPON GAME THEORETIC MODEL AND RELATED METHODS," which is filed on the same date and by the same assignee and inventors, the disclosure is hereby incorporated herein in its entirety by reference.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

The invention claimed is:

1. A cognitive radio system comprising:
   a plurality of cognitive radio frequency (RF) radios; and
   a controller configured to selectively change at least one operating parameter of the plurality of cognitive RF radios based upon a cognitive group hierarchy including a first group based upon a signal modulation classification, a second group based upon a waveform requirement, a third group based upon an optimal cognitive RF radio path, a fourth group based upon a cognitive RF radio dynamic spectrum allocation, and a fifth group based upon frequency hopping.

2. The cognitive radio system of claim 1 wherein the first group performs signal modulation classification based upon a linear program.

3. The cognitive radio system of claim 1 wherein the second group defines waveform requirements based upon a linear program.

4. The cognitive radio system of claim 1 wherein the third group determines an optimal cognitive RF radio path based upon a Dijkstra shortest path graph theoretic model.

5. The cognitive radio system of claim 4 wherein the Dijkstra shortest path graph theoretic model is based upon edge costs.

6. The cognitive radio system of claim 1 wherein the fourth group performs cognitive RF radio dynamic spectrum allocation based upon a Shapley value game theoretic model.

7. The cognitive radio system of claim 6 wherein the Shapley value game theoretic model is based upon cognitive RF radio usage.

8. The cognitive radio system of claim 1 wherein the fifth group performs frequency hopping based upon a linear program.

9. A controller for a cognitive radio system comprising:
   a memory and a processor cooperating with the memory to selectively change at least one operating parameter of a plurality of cognitive radio frequency (RF) radios based upon a cognitive group hierarchy;
   the cognitive group hierarchy including a first group based upon a signal modulation classification, a second group based upon a waveform requirement, a third group based upon an optimal cognitive RF radio path, a fourth group based upon a cognitive RF radio dynamic spectrum allocation, and a fifth group based upon frequency hopping.

10. The controller for a cognitive radio system of claim 9 wherein the first group performs signal modulation classification based upon a linear program.

11. The controller for a cognitive radio system of claim 9 wherein the second group defines waveform requirements based upon a linear program.

12. The controller for a cognitive radio system of claim 9 wherein the third group determines an optimal cognitive RF radio path based upon a Dijkstra shortest path graph theoretic model.

13. The controller for a cognitive radio system of claim 12 wherein the Dijkstra shortest path graph theoretic model is based upon edge costs.

14. The controller for a cognitive radio system of claim 9 wherein the fourth group performs cognitive RF radio dynamic spectrum allocation based upon a Shapley value game theoretic model.

15. The controller for a cognitive radio system of claim 14 wherein the Shapley value game theoretic model is based upon cognitive RF radio usage.

16. The controller for a cognitive radio system of claim 9 wherein the fifth group performs frequency hopping based upon a linear program.

17. A communication method comprising:
   operating a plurality of cognitive radio frequency (RF) radios; and
   selectively changing at least one operating parameter of the plurality of cognitive RF radios based upon a cognitive group hierarchy including a first group based upon a signal modulation classification, a second group based upon a waveform requirement, a third group based upon an optimal cognitive RF radio path, a fourth group based upon a cognitive RF radio dynamic spectrum allocation, and a fifth group based upon frequency hopping.

18. The communication method of claim 17 wherein the first group performs signal modulation classification based upon a linear program.

19. The communication method of claim 17 wherein the second group defines waveform requirements based upon a linear program.

20. The communication method of claim 17 wherein the third group determines an optimal cognitive RF radio path based upon a Dijkstra shortest path graph theoretic model.

21. The communication method of claim 17 wherein the fourth group performs cognitive RF radio dynamic spectrum allocation based upon a Shapley value game theoretic model.

22. The communication method of claim 17 wherein the fifth group performs frequency hopping based upon a linear program.

* * * * *